US012562137B2

(12) United States Patent
Ooishi et al.

(10) Patent No.: US 12,562,137 B2
(45) Date of Patent: Feb. 24, 2026

(54) DIMMING DEVICE AND DIMMING METHOD

(71) Applicant: Panasonic Automotive Systems Co., Ltd., Kanagawa (JP)

(72) Inventors: Yoshihisa Ooishi, Kanagawa Ken (JP); Shoichi Ishikawa, Kanagawa Ken (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 0 days.

(21) Appl. No.: 19/076,643

(22) Filed: Mar. 11, 2025

(65) Prior Publication Data

US 2025/0308481 A1 Oct. 2, 2025

(30) Foreign Application Priority Data

Mar. 29, 2024 (JP) ................................ 2024-057350

(51) Int. Cl.
*G09G 3/36* (2006.01)

(52) U.S. Cl.
CPC ....... *G09G 3/3696* (2013.01); *G09G 2310/08* (2013.01); *G09G 2320/0223* (2013.01)

(58) Field of Classification Search
CPC ............ G09G 3/3696; G09G 2310/08; G09G 2320/0223
USPC .......................................................... 345/87
See application file for complete search history.

(56) References Cited

U.S. PATENT DOCUMENTS 3,936,815 A * 2/1976 Kogure .............. G02F 1/13731 345/94
7,002,544 B2 2/2006 Sekido

FOREIGN PATENT DOCUMENTS

JP 2003-162262 6/2003

* cited by examiner

*Primary Examiner* — Mark Edwards
(74) *Attorney, Agent, or Firm* — Greenblum & Bernstein, P.L.C.

(57) ABSTRACT

A dimming device includes a dimming layer, a plurality of first electrodes, a plurality of second electrodes, a row drive circuit, a column drive circuit, and a control circuit. The dimming layer includes a first main surface and a second main surface opposite the first main surface. The first electrodes each extend in a row direction and face the first main surface. The second electrodes each extend in a column direction and face the second main surface. The row drive circuit applies voltage to the first electrodes. The column drive circuit applies voltage to the second electrodes. The control circuit adjusts timing of either voltage to be applied to the first electrode by the row drive circuit or voltage to be applied to the second electrode by the column drive circuit.

10 Claims, 14 Drawing Sheets

DIMMING DEVICE AND DIMMING METHOD

CROSS-REFERENCE TO RELATED APPLICATIONS

This application is based upon and claims the benefit of priority from Japanese Patent Application No. 2024-057350, filed on Mar. 29, 2024, the entire contents of which are incorporated herein by reference.

FIELD

The present disclosure relates generally to a dimming device and a dimming method.

BACKGROUND

A dimming device has been known to be capable of transmitting and attenuating external light received from the back surface (See, for example, Patent Literature: JP 2003-162262 A). The dimming performance of the dimming device is desirably improved.

SUMMARY

A dimming device according to one aspect of the present disclosure includes a dimming layer, a plurality of first electrodes, a plurality of second electrodes, a row drive circuit, a column drive circuit, and a control circuit. The dimming layer includes a first main surface and a second main surface. The second main surface is provided opposite the first main surface. Each of the first electrodes extends in a row direction and faces the first main surface. Each of the second electrodes extends in a column direction and faces the second main surface. The row drive circuit is configured to apply voltage to the first electrodes. The column drive circuit is configured to apply voltage to the second electrodes. The control circuit is configured to adjust timing of either voltage to be applied to the first electrode by the row drive circuit or voltage to be applied to the second electrode by the column drive circuit.

DETAILED DESCRIPTION

Hereinafter, an embodiment of a dimming device according to the present disclosure will be described with reference to the drawings.

Embodiment

A dimming device according to an embodiment can transmit or attenuate external light from the back surface, and is devised for improving dimming performance.

Figure 1:
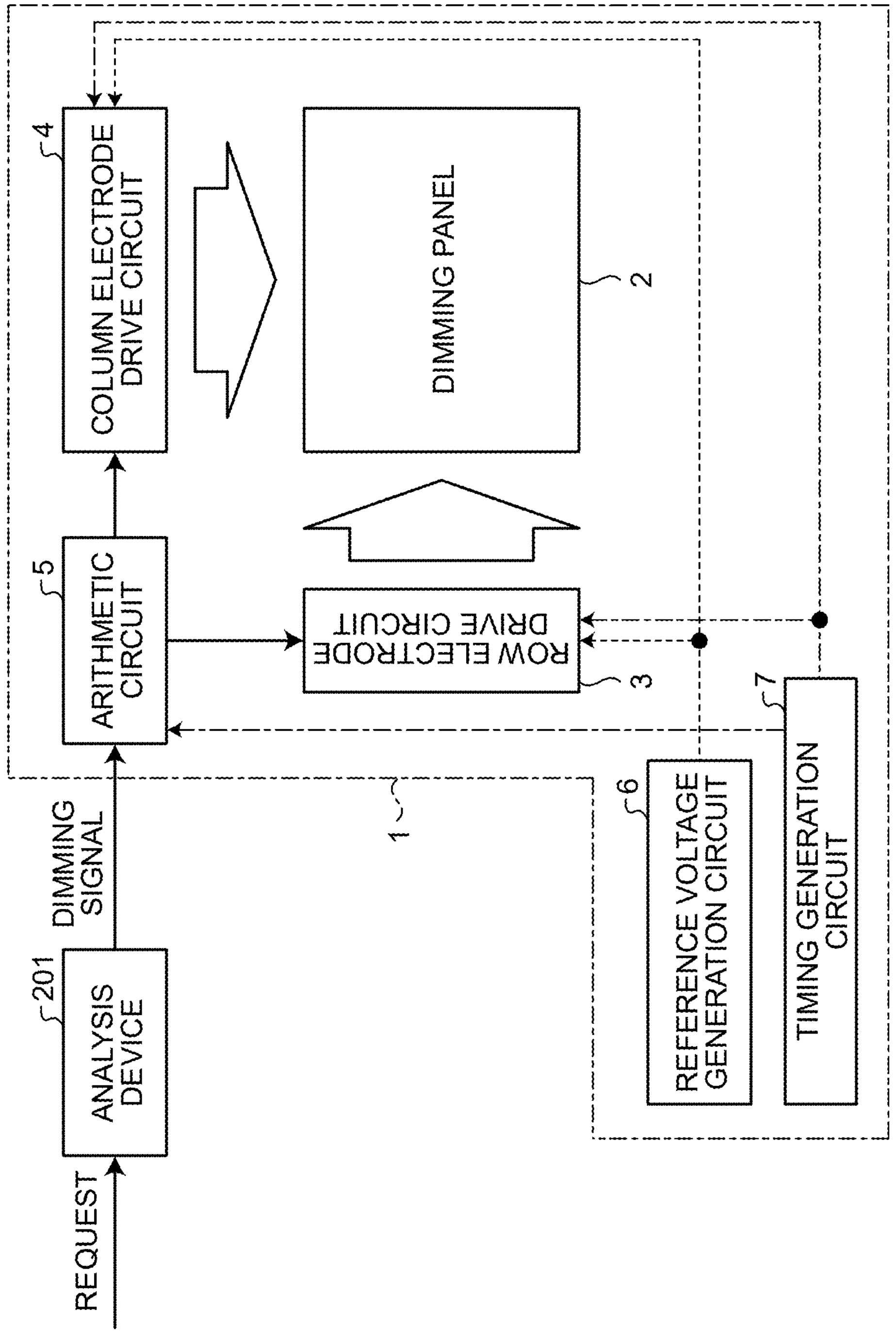
FIG. 1 is a block diagram illustrating a schematic configuration of a dimming device according to an embodiment.

A dimming device 1 can be configured as illustrated in FIG. 1. FIG. 1 is a block diagram illustrating a configuration of the dimming device 1.

The dimming device 1 can two-dimensionally perform dimming, such as transmitting or attenuating external light from the back surface.

In the present specification, a state where the dimming device transmits external light (namely, allows the external light to pass through) is referred to as an ON state, and a state where the dimming device attenuates external light is referred to as an OFF state. Attenuating external light can also be referred to as shielding of light.

When part of regions of the dimming device is in a state of transmitting external light, this situation is referred to as "the region is in the ON state", and each region in this state may be referred to as a transmission region.

Similarly, when part of a region of the dimming device is in a state of attenuating external light, this situation is referred to as "the region is in the OFF state", and each region in this state may be referred to as a light-shielding region.

In the present specification, "being electrically connected" between a first element and a second element encompasses being connected with a third element interposed between the first element and the second element to the extent that the functions of the first element and the second element are not hindered.

The dimming device 1 can be communicably connected to an analysis device 201. The analysis device 201 receives a request related to dimming from a higher-level controller. The request may be, for example, in a form of an illuminance distribution or the like with respect to external light, or may be a request of a two-dimensional position of a region to be shielded from light. The analysis device 201 analyzes a request related to dimming, generates a dimming signal in accordance with an analysis result, and supplies the dimming signal to the dimming device 1. The dimming device 1 includes multiple regions for which dimming is required. In accordance with a dimming signal, the dimming device 1 can determine which one of the light-transmitting region and the light-shielding region is assigned for each of the regions in accordance with the dimming signal.

The dimming device 1 includes a dimming panel 2, a row electrode drive circuit 3 (an example of the row drive circuit), a column electrode drive circuit 4 (an example of the column drive circuit), an arithmetic circuit 5 (an example of the control circuit), a reference voltage generation circuit 6, and a timing generation circuit 7.

Figure 2:
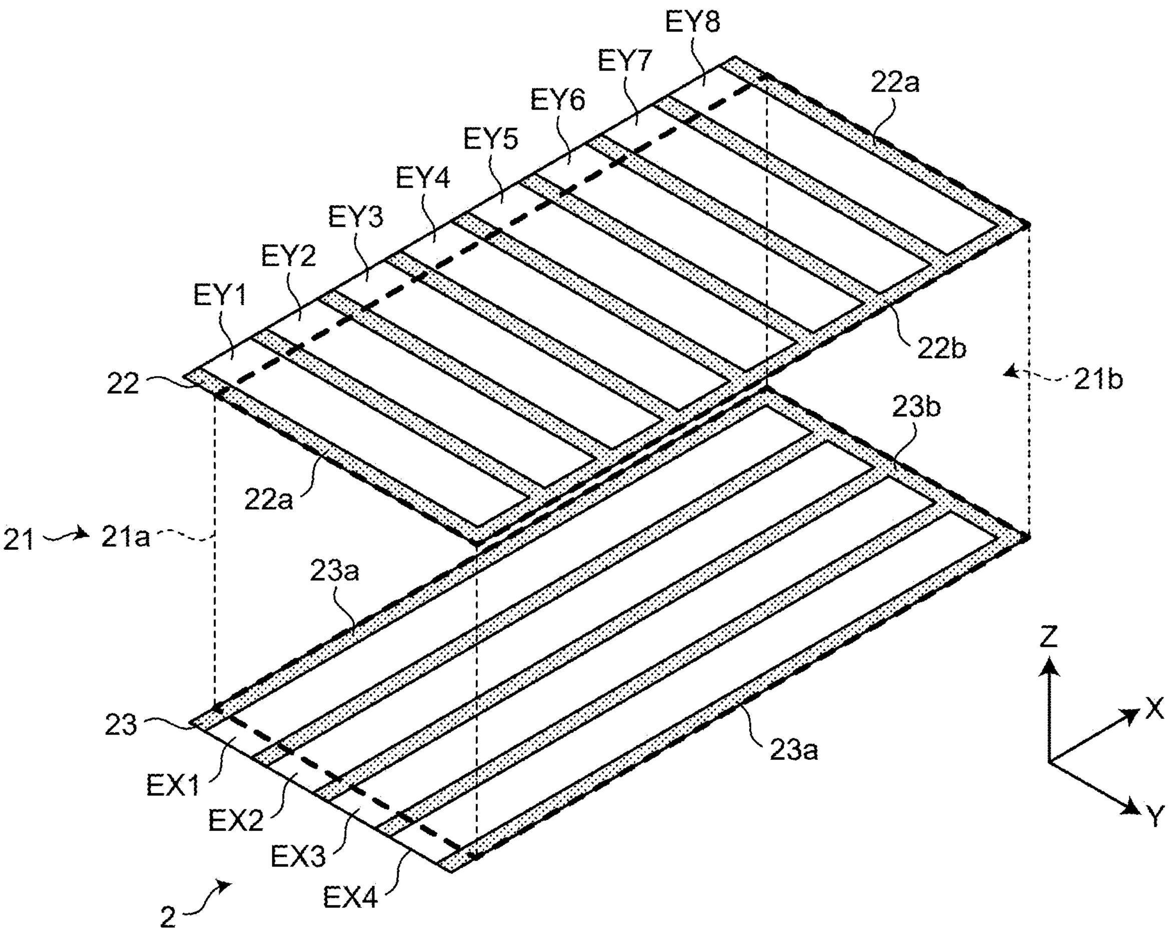
FIG. 2 is a perspective view illustrating a configuration of a dimming panel in the embodiment.

As illustrated in FIG. 2, the dimming panel 2 includes a dimming layer 21, a plurality of column electrodes EY1 to EY8 (an example of the second electrodes), and a plurality of row electrodes EX1 to EX4 (an example of the first electrodes). FIG. 2 is a perspective view illustrating a configuration of the dimming panel 2. In FIG. 2, a direction perpendicular to the front surface of the dimming panel 2 is defined as a Z direction, a longitudinal direction of the dimming panel 2 is defined as an X direction, and a direction perpendicular to the X direction and the Z direction is defined as a Y direction. In FIG. 2, eight column electrodes EY1 to EY8 are illustrated as an example, but the number of the column electrodes EY may be any of two to seven, or nine or more. In FIG. 2, four row electrodes EX1 to EX4 are illustrated as an example, but the number of the row electrodes EX may be two or three, or five or more.

The dimming layer 21 extends in a substantially plate shape in an XY direction. The dimming layer 21 may be configured such that a dimming liquid crystal 21*b* is sealed in a box-shaped member 21*a*. The dimming layer 21 includes a front surface on the +Z side and a back surface on the −Z side. A +Z-side surface of the box-shaped member 21*a* can constitute a front surface of the dimming layer 21, and a −Z-side surface of the member 21*a* can constitute a back surface of the dimming layer 21.

The column electrodes EY1 to EY8 are provided on the +Z side of the dimming layer 21. The column electrodes EY1 to EY8 may be provided at a substrate 22 provided on the front surface of the dimming layer 21. The substrate 22 may be bonded to the front surface of the dimming layer 21 with an adhesive or the like. The substrate 22 extends in a plate shape in the XY direction. Each of the column electrodes EY can include a transparent conductive material such as indium tin oxide (ITO). The substrate 22 can include a transparent insulation resin or the like.

On the substrate 22, the column electrodes EY1 to EY8 are insulated from each other by insulation parts 22*a* and an insulation part 22*b*, and are arrayed in the X direction. The column electrodes EY1 to EY8 are arrayed in the X direction along the front surface of the dimming layer 21. On the substrate 22, each column electrode EY extends in the Y direction. The insulation parts 22*a* each extend in the Y direction between the plurality of column electrodes EY1 to EY8. The insulation part 22*b* extends in the X direction and connects +Y-side end parts of the insulation parts 22*a*.

The row electrodes EX1 to EX4 are provided on the −Z side of the dimming layer 21. The row electrodes EX1 to EX4 may be provided at a substrate 23 provided on the back surface of the dimming layer 21. The row electrodes EX1 to EX4 face the column electrodes EY1 to EY8 while interposing the dimming layer 21 between them. The substrate 23 may be bonded to the back surface of the dimming layer 21 with an adhesive or the like. The substrate 23 extends in a plate shape in the XY direction. Each of the row electrodes EX can include a transparent conductive material such as ITO. The substrate 23 can include a transparent insulation resin or the like.

On the substrate 23, the row electrodes EX1 to EX4 are insulated from each other by insulation parts 23*a* and an insulation part 23*b*, and are arrayed in the Y direction. The row electrodes EX1 to EX4 are arrayed in the Y direction along the front back surface of the dimming layer 21. On the substrate 23, each row electrode EX extends in the X direction. The insulation parts 23*a* each extend in the X direction between the row electrodes EX1 to EX4. The insulation part 23*b* extends in the Y direction and connects +X-side end parts of the insulation parts 23*a*.

Figure 3:
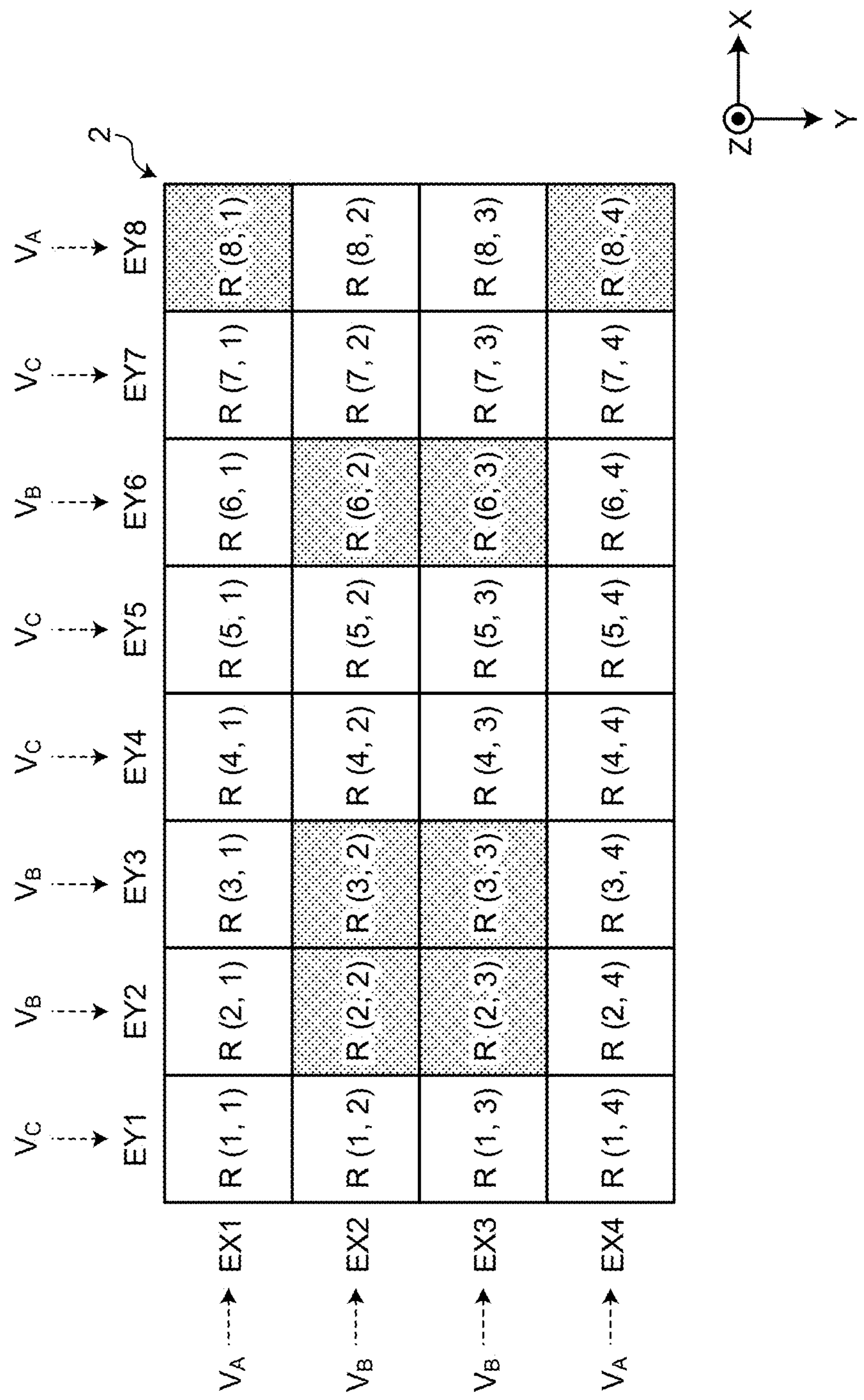
FIG. 3 is a plan view illustrating multiple regions partitioned by the dimming panels in the embodiment.

In the dimming layer 21, multiple regions R(1,1) to R(8,4) as illustrated in FIG. 3 are partitioned at intersection positions of the column electrodes EY1 to EY8 and the row electrodes EX1 to EX4. FIG. 3 is a plan view illustrating the regions R(1,1) to R(8,4) partitioned by the dimming panel 2.

The dimming layer 21 includes the regions R(1,1) to R(8,4) partitioned in a matrix. Each row extends in the X direction, and each column extends in the Y direction. The X direction may be referred to as a row direction, and the Y direction may be referred to as a column direction.

The region R(1,1) is formed in the dimming layer 21 at a position where the column electrode EY1 and the row electrode EX1 intersect each other when seen through from the Z direction. In the region R(1,1), voltage is applied from the column electrode EY1 on the +Z side, and voltage is applied from the row electrode EX1 on the −Z side.

The region R(2,1) is formed in the dimming layer 21 at a position where the column electrode EY2 and the row electrode EX1 intersect each other when seen through from the Z direction. In the region R(2,1), voltage is applied from the column electrode EY2 on the +Z side, and voltage is applied from the row electrode EX1 on the −Z side.

The region R(8,4) is formed in the dimming layer 21 at a position where the column electrode EY8 and the row electrode EX4 intersect each other when seen through from the Z direction. In the region R(8,4), voltage is applied from the column electrode EY8 on the +Z side, and voltage is applied from the row electrode EX4 on the −Z side.

The dimming device 1 can perform ON/OFF control of each of the regions R(1,1) to R(8,4). The region R controlled so as to be in the ON state may be referred to as a transmission region. The region R that is controlled to be in the OFF state may be referred to as a light-shielding region.

In FIG. 3, the row electrode drive circuit 3 applies voltages $V_A$, $V_B$, $V_B$, and $V_A$ to the row electrodes EX1, EX2, EX3, and EX4, respectively. The column electrode drive circuit 4 applies voltages $V_C$, $V_B$, $V_B$, $V_C$, $V_C$, $V_B$, $V_C$, and $V_A$ to the column electrodes EY1, EY2, EY3, EY4, EY5, EY6, EY7, and EY8, respectively. The voltages $V_A$, $V_B$, and $V_C$ may be different from one another.

The dimming device 1 thus attempts to apply substantially equal voltages to both ends in the Z direction to the region R(8,1), the region R(2,2), the region R(3,2), the region R(6,2), the region R(2,3), the region R(3,3), the region R(6,3), and the region R(8,4) among the regions R(1,1) to R(8,4). When substantially equal voltages are applied to both ends in the Z direction, as illustrated as an example in FIG. 3, a light-shielding pattern in which the region R(8,1), the region R(2,2), the region R(3,2), the region R(6,2), the region R(2,3), the region R(3,3), the region R(6,3), and the region R(8,4) in the dimming layer 21 are selectively set to the OFF state can be realized.

A display device that displays an image is required to have a high contrast ratio, and a super twisted nematic (STN) liquid crystal that is used together with a polarizing plate and can secure a contrast ratio can be used.

On the other hand, the dimming device 1 with a high transmittance in an ON state where external light is transmitted is useful. Thus, for the dimming layer 21 of the dimming panel 2, the dimming liquid crystal 21*b* that does not require a polarizing plate and can secure a high transmittance can be used. The dimming liquid crystal 21*b* includes a guest host (GH) liquid crystal. The GH liquid crystal may be a liquid crystal in which a dichroic dye is added to the twisted liquid crystal material. The dichroic dye is a dye having anisotropy in absorption characteristics.

Figure 4:
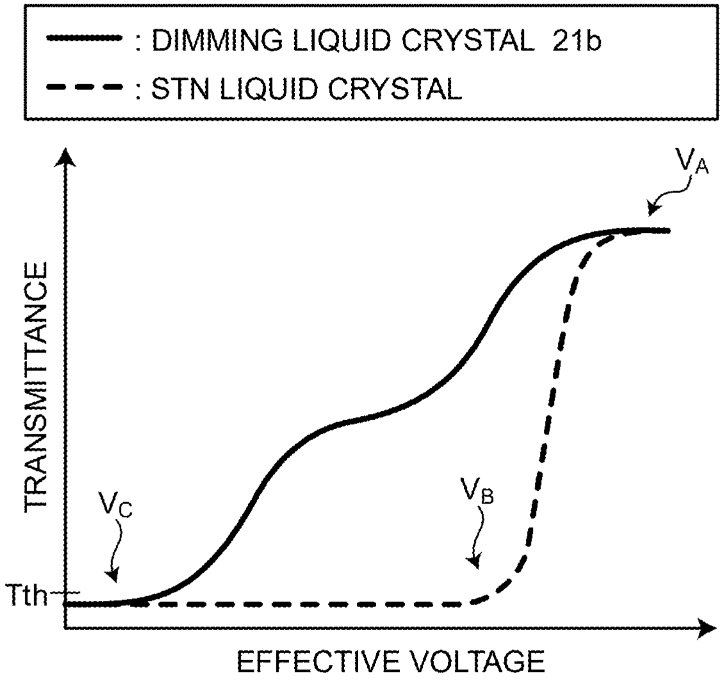
FIG. 4 is a diagram illustrating characteristics of a dimming liquid crystal in the embodiment.

For each of the dimming liquid crystal (e.g., GH liquid crystal) 21*b* and the STN liquid crystal, the variation characteristics of a transmittance with respect to an applied voltage is as illustrated in FIG. 4. In FIG. 4, the vertical axis represents the magnitude of a transmittance, which is a relative value when the transmittances in the ON state are equal to each other is illustrated. The horizontal axis represents the magnitude of an effective voltage applied to the liquid crystal.

In FIG. 4, the variation characteristics in a case where the dimming liquid crystal 21*b* is the GH liquid crystal is indicated by a solid line, and the variation characteristics of the STN liquid crystal is indicated by a dotted line as a comparative example. An example of a normally black mode in which the transmittance is low at a low effective voltage is illustrated in the variation characteristics of both the dimming liquid crystal 21*b* and the STN liquid crystal.

In the dimming liquid crystal 21*b*, the transmittance varies more gradually with respect to the applied effective voltage than in the STN liquid crystal. For example, the minimum applied voltage in a range in which transmittance has substantially the maximum value, namely, the ON voltage, is set as the voltage $V_A$ in both the liquid crystal materials. The maximum applied voltage in a range in which transmittance is smaller than a threshold value Tth, namely, the OFF voltage, is the voltage $V_B$ slightly lower than the voltage $V_A$ in the STN liquid crystal. On the other hand, in the GH liquid crystal, the voltage $V_C$ is significantly lower than the voltage $V_A$.

In the dimming device 1, when a voltage having substantially equal amplitude but shifted in timing is applied to both ends in the Z direction of each light-shielding region R in the dimming layer 21, a voltage exceeding the voltage $V_C$ may be temporarily applied to both ends in the Z direction of the light-shielding region R. As a result, the dimming performance may be temporarily deteriorated.

In view of the above, in the present embodiment, the dimming device 1 improves the dimming performance by adjusting the timing of either the voltage applied to the row electrode EX by the row electrode drive circuit 3 or the voltage applied to the column electrode EY by the column electrode drive circuit 4.

In the dimming device 1, the arithmetic circuit 5 estimates the delay amount in each of the row electrode drive circuit 3 and the column electrode drive circuit 4, adjusts the row control signal and the column control signal in accordance with the estimated delay amount, and supplies the adjusted row control signal and column control signal to the row electrode drive circuit 3 and the column electrode drive circuit 4, respectively. In this way, the arithmetic circuit 5 adjusts the timing of either the voltage applied to the row electrode by the row electrode drive circuit 3 or the voltage applied to the column electrode by the column electrode drive circuit 4. The arithmetic circuit 5 may delay the timing of the voltage applied to the row electrode by the row electrode drive circuit 3 or the timing of the voltage applied to the column electrode by the column electrode drive circuit 4. The voltage whose timing is to be delayed has a smaller delay amount with respect to reference timing. The reference timing may be edge timing of a timing signal generated by the timing generation circuit 7. The edge timing may be timing of a rising edge or timing of a falling edge.

Figure 5:
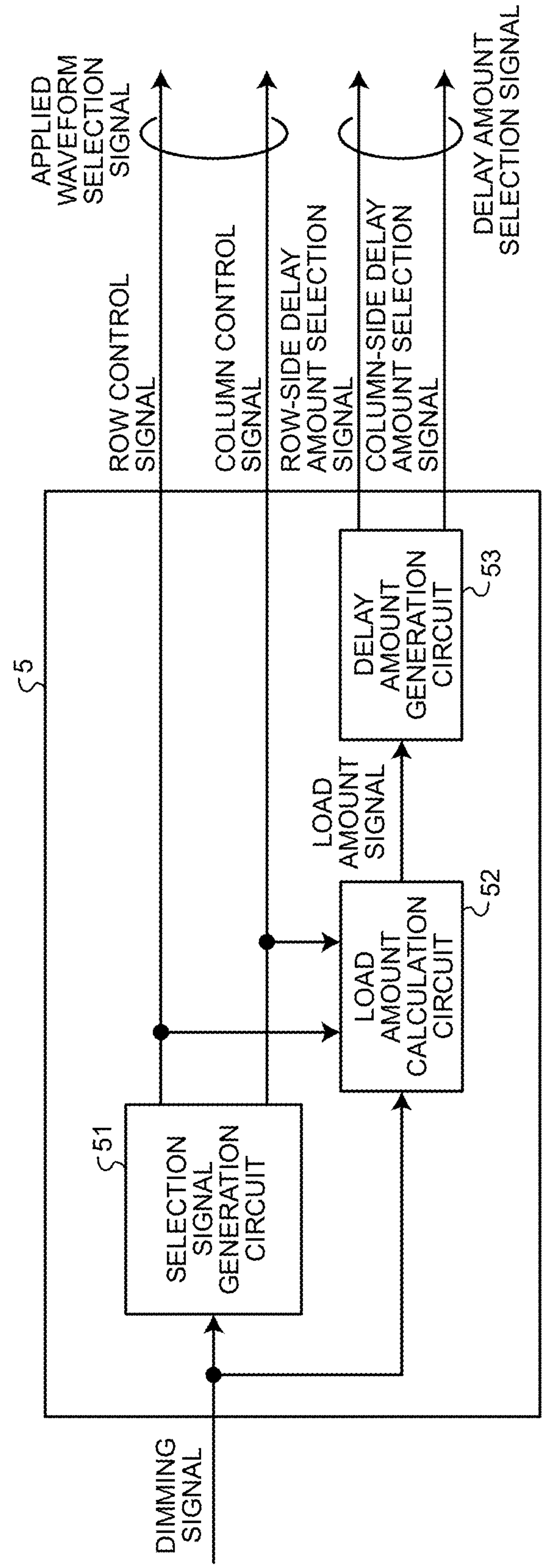
FIG. 5 is a block diagram illustrating a configuration of an arithmetic circuit in the embodiment.

The arithmetic circuit 5 can be configured as illustrated in FIG. 5. FIG. 5 is a block diagram illustrating a configuration of the arithmetic circuit 5.

The arithmetic circuit 5 includes a selection signal generation circuit 51, a load amount calculation circuit 52, and a delay amount generation circuit 53.

The selection signal generation circuit 51 receives the dimming signal from the analysis device 201. In the dimming device 1, applied waveform signals are set in advance. The applied waveform signals may be preset in each of the selection signal generation circuit 51, the row electrode drive circuit 3, and the column electrode drive circuit 4. The dimming signal includes an instruction to designate an applied waveform signal to be supplied to the column electrodes EY1 to EY8 and an instruction to designate an applied waveform signal to be supplied to the row electrodes EX1 to EX4, among the applied waveform signals. The selection signal generation circuit 51 synchronizes with the clock signal, generates a column control signal corresponding to the dimming signal and supplies the generated column control signal to the column electrode drive circuit 4, and generates a row control signal corresponding to the dimming signal and supplies the generated row control signal to the row electrode drive circuit 3. The column control signal includes an instruction of a voltage waveform to be supplied to each column electrode EY. The row control signal includes an instruction of a voltage waveform to be supplied to each row electrode EX. A signal including the row control signal and the column control signal may be referred to as an applied waveform selection signal.

The load amount calculation circuit 52 receives the dimming signal from the analysis device 201, and receives the row control signal and a column control signal from the selection signal generation circuit 51. The load amount calculation circuit 52 identifies the light-shielding pattern for each time segment in accordance with the dimming signal, the row control signal, and the column control signal, and calculates the load amount of voltage to be supplied to each light-shielding region R in accordance with the light-shielding pattern.

The load amount of each light-shielding region R attributable to the row electrode EX is determined with the load attributable to the parasitic resistance component of the row electrode EX and the load attributable to the parasitic capacitance component formed between the row electrode EX and the column electrode EY. Compared with the light-shielding region R, the light-transmitting region R is considered to have a relatively large load because a larger voltage is applied between the row electrode EX and the column electrode EY in the light-transmitting region R than in the light-shielding region R. Given this factor, the load amount can be schematically calculated by Mathematical Expression (1) described below. The load amount is a numerical value for relatively grasping the magnitude of the load.

$$\text{(Load amount attributable to row electrode } EX) = \big(\text{The number of transmission regions from input end to target light-shielding region of row electrode } EX\big) + \big(\text{The number of transmission regions from target light-shielding region to distal end of row electrode } EX\big)/4 \quad (1)$$

Figure 6A:
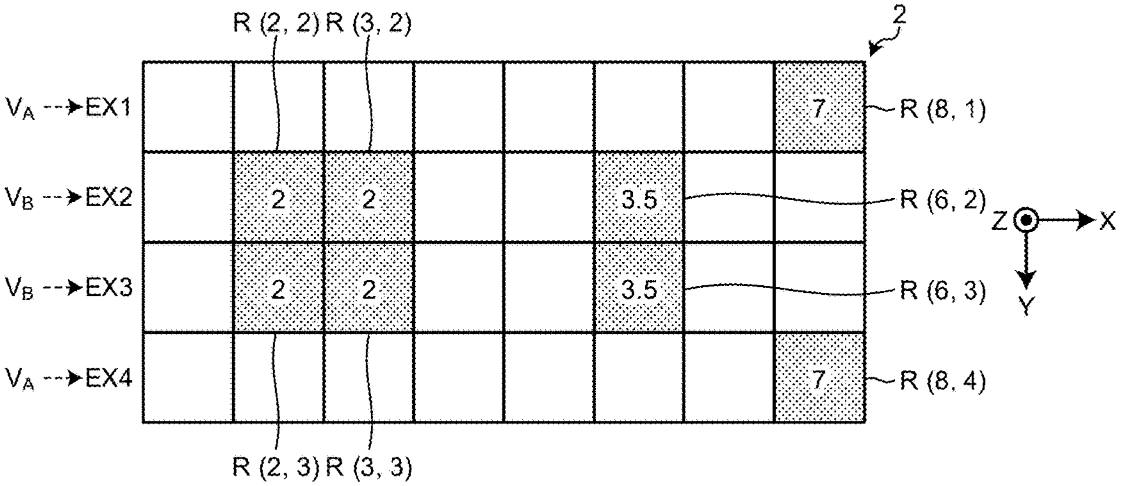
FIGS. 6A to 6C are diagrams each illustrating calculation of a load amount in the embodiment.
Figure 6B:
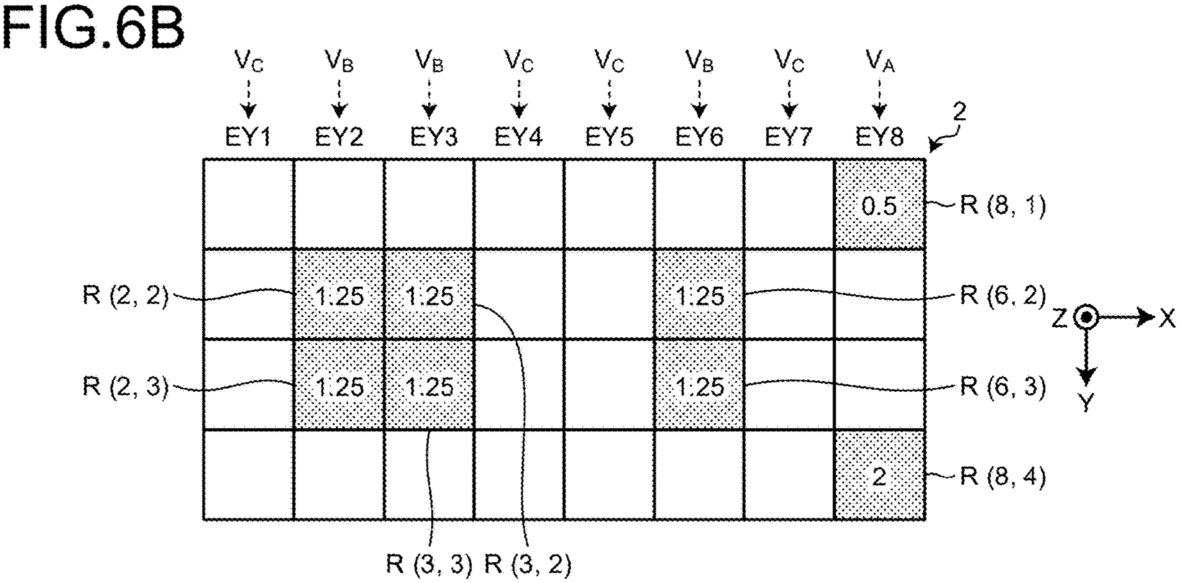
Figure 6C:
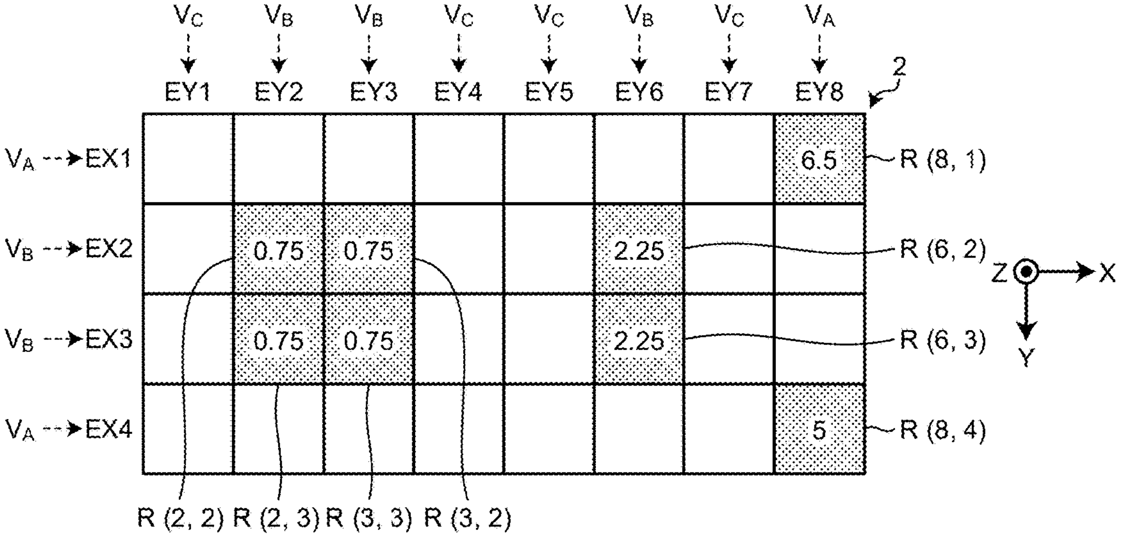

In the light-shielding pattern illustrated in FIG. 3, the load amount of each light-shielding region R attributable to the row electrode EX can be estimated as illustrated in FIG. 6A by Mathematical Expression 1. FIGS. 6A to 6C are diagrams each illustrating calculation of a load amount. The load amount calculation circuit 52 calculates the load amounts attributable to the row electrode EX of the region R(8,1), the region R(2,2), the region R(3,2), the region R(6,2), the region R(2,3), the region R(3,3), the region R(6,3), and the region R(8,4) as 7, 2, 2, 3.5, 2, 2, 3.5, and 7, respectively.

Similarly, the load amount of each light-shielding region R attributable to the column electrode EY is determined with the load attributable to the parasitic resistance component of the column electrode EY and the load attributable to the parasitic capacitance component formed between the column electrode EY and the row electrode EX. Compared with the light-shielding region R, the light-transmitting region R is considered to have a relatively large load because a larger voltage is applied between the column electrode EY and the row electrode EX in the light-transmitting region R than in the light-shielding region R. Given this factor, the load amount can be schematically calculated by Mathematical Expression (2) described below. The load amount is a numerical value for relatively grasping the magnitude of the load.

$$\text{(Load amount attributable to column electrode } EY) = \big(\text{The number of transmission regions from input end to target light-shielding region of column electrode } EY\big) + \big(\text{The number of transmission regions from target light-shielding region to distal end of column electrode } EY\big)/4 \quad (2)$$

In the light-shielding pattern illustrated in FIG. 3, the load amount of each light-shielding region R attributable to the column electrode EY can be estimated as illustrated in FIG. 6B by Mathematical Expression 2. The load amount calculation circuit 52 calculates the load amounts attributable to the row electrode EX of the region R(8,1), the region R(2,2), the region R(3,2), the region R(6,2), the region R(2,3), the region R(3,3), the region R(6,3), and the region R(8,4) as 0.5, 1.25, 1.25, 1.25, 1.25, 1.25, 1.25, and 2, respectively.

The load amount difference between both ends in the Z direction of each light-shielding region R can be obtained as a difference between the load amount attributable to the row electrode EX and the load amount attributable to the column electrode EY as expressed by Mathematical Expression (3) described below.

$$\text{(Load amount difference between both ends in } Z \text{ direction)} = \text{(Load amount attributable to row electrode } EX) - \text{(Load amount attributable to column electrode } EY) \quad (3)$$

In the light-shielding pattern illustrated in FIG. 3, the load amount difference between both ends in the Z direction can be estimated as illustrated in FIG. 6C by Mathematical Expression 3. The load amount calculation circuit 52 calculates the load amount differences between both ends in the Z direction of the region R(8,1), the region R(2,2), the region R(3,2), the region R(6,2), the region R(2,3), the region R(3,3), the region R(6,3), and the region R(8,4) as 6.5, 0.75, 0.75, 2.25, 0.75, 0.75, 2.25, and 5, respectively.

The load amount calculation circuit 52 supplies a calculation result of the load amount difference between both ends in the Z direction to the delay amount generation circuit 53 as a load amount signal.

The delay amount generation circuit 53 receives the load amount signal. The load amount signal includes information in which the row position and the column position of the light-shielding region R and the load amount difference between both ends in the Z direction are associated with each other for the light-shielding regions R. The load amount signal may include map information as illustrated as an example in FIG. 6C. In accordance with the load amount signal, the delay amount generation circuit 53 obtains a delay amount to be added to the voltage supply to each light-shielding region R. The delay amount generation circuit 53 may obtain a delay amount for delaying the timing of the voltage applied to the row electrode EX by the row electrode drive circuit 3 or the timing of the voltage applied to the column electrode EY by the column electrode drive circuit 4. The voltage whose timing is to be delayed has a smaller delay amount with respect to the reference timing.

In the light-shielding pattern illustrated in FIG. 3, when FIG. 6A and FIG. 6B are compared with each other, the load amount attributable to the column electrode EY is smaller than the load amount attributable to the row electrode EX in all the light-shielding regions R. This leads to an expectation that the delay amount of the voltage applied to the column electrode EY by the column electrode drive circuit 4 is smaller than the delay amount of the voltage applied to the row electrode EX by the row electrode drive circuit 3.

For this reason, the delay amount generation circuit 53 delays the column control signal without delaying the row control signal such that the load amount difference between both ends in the Z direction approaches zero.

Figure 7A:
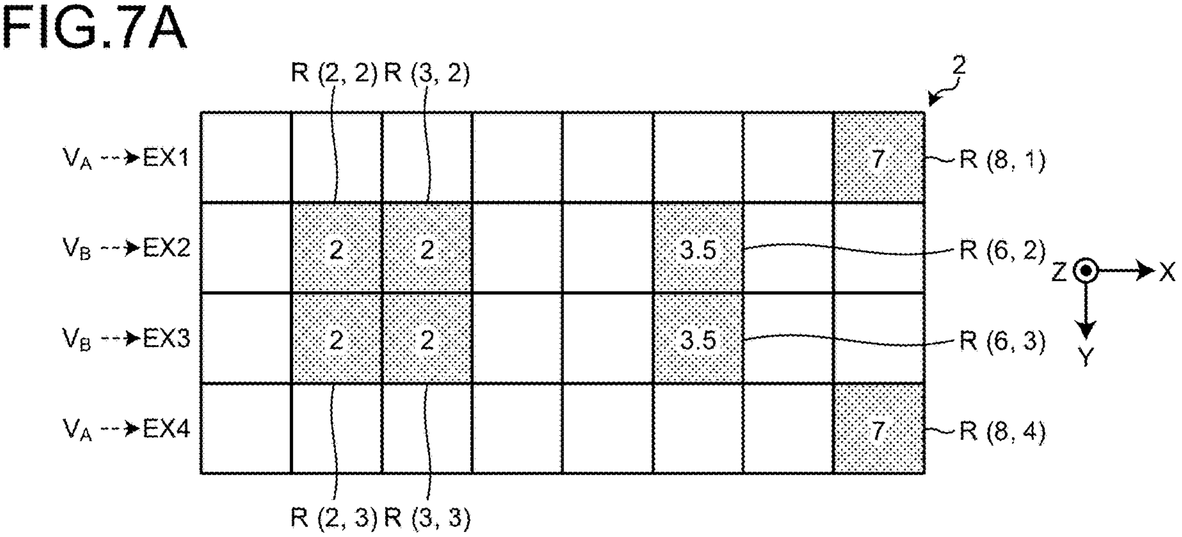
FIGS. 7A to 7C are diagrams each illustrating estimation of a delay amount in the embodiment.

As illustrated in FIG. 7A, the delay amount generation circuit 53 sets the delay amount to be added to the voltages applied to the row electrodes EX1, EX2, EX3, and EX4 to zero. In this way, voltages applied to the row electrodes EX1, EX2, EX3, and EX4 are $V_A$, $V_B$, $V_B$, and $V_A$, respectively.

Figure 7B:
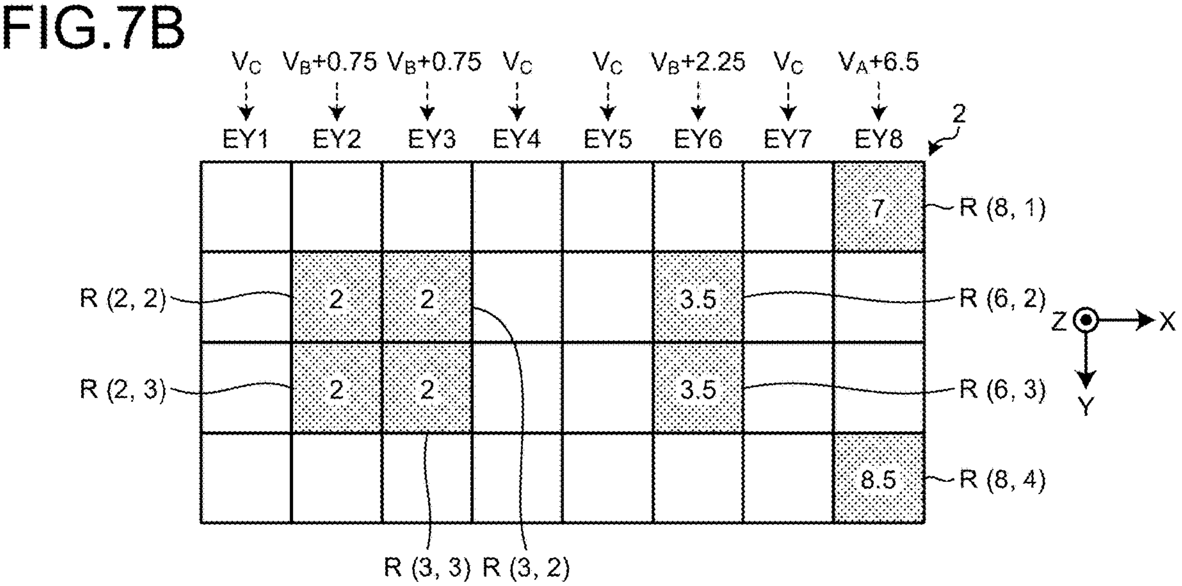

As illustrated in FIG. 7B, the delay amount generation circuit 53 sets delay amounts to be added to voltages applied to the column electrodes EY1, EY2, EY3, EY4, EY5, EY6, EY7, and EY8 to 0, 0.75, 0.75, 0, 0, 2.25, 0, and 6.5, respectively. In this way, the voltages applied to the column electrodes EY1, EY2, EY3, EY4, EY5, EY6, EY7, and EY8 are $V_C$, $V_B$+0.75, $V_B$+0.75, $V_C$, $V_C$, $V_B$+2.25, $V_C$, and $V_A$+6.5, respectively.

Figure 7C:
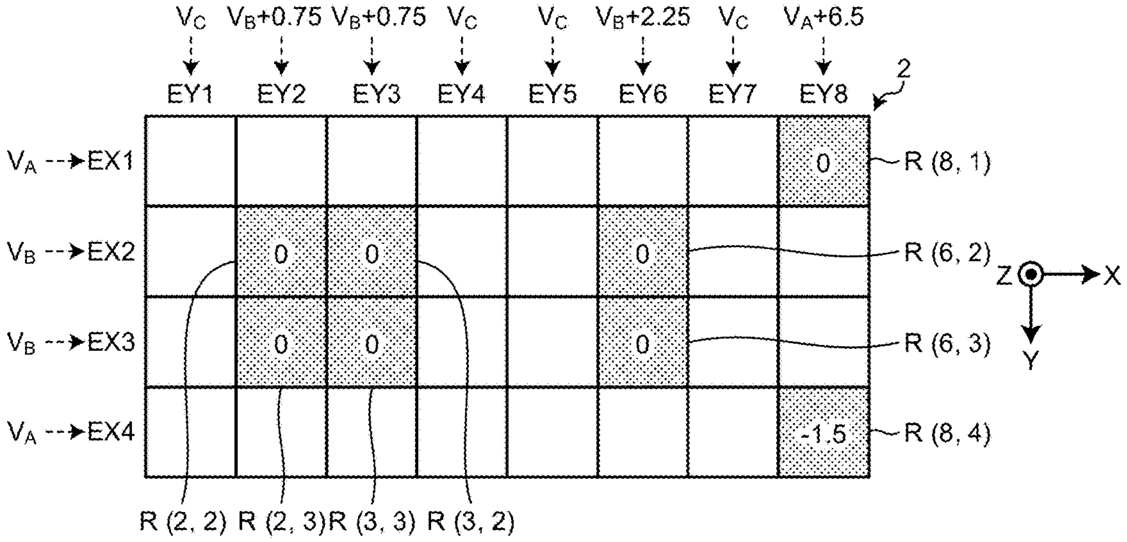

As a result, the load amount difference between both ends in the Z direction of each light-shielding region R approaches zero as illustrated in FIG. 7C. The load amount differences between both ends in the Z direction of the region R(8,1), the region R(2,2), the region R(3,2), the region R(6,2), the region R(2,3), the region R(3,3), the region R(6,3), and the region R(8,4) are 0, 0, 0, 0, 0, 0, 0, and −1.5, respectively.

Note that, in FIGS. 6A to 7C, a case where the delay amount is adjusted such that the load amount difference between both ends in the Z direction of the light-shielding region R having a large load amount difference is preferentially brought close to zero is illustrated as an example. However, the delay amount may be adjusted such that the total value of the load amount differences is minimized.

The delay amount generation circuit 53 generates a row-side delay amount selection signal indicating a delay amount to be added to the row control signal, and supplies the row-side delay amount selection signal to the row electrode drive circuit 3. The delay amount generation circuit 53 generates a column-side delay amount selection signal indicating a delay amount to be added to the column control signal, and supplies the column-side delay amount selection signal to the column electrode drive circuit 4. A signal including the row-side delay amount selection signal and the column-side delay amount selection signal may be referred to as a delay amount selection signal.

The arithmetic circuit 5 may be connected to the column electrode drive circuit 4 and the row electrode drive circuit 3 via a serial communication line. The arithmetic circuit 5 may supply the column control signal and the column-side delay amount selection signal to the column electrode drive circuit 4 as serial signals. The arithmetic circuit 5 may supply the row control signal and the row-side delay amount selection signal to the row electrode drive circuit 3 as serial signals.

The column electrode drive circuit 4 receives a column control signal and a column-side delay amount selection signal from the arithmetic circuit 5. The column electrode drive circuit 4 is electrically connected to the column electrodes EY1 to EY8. The column electrode drive circuit 4 synchronizes with the clock signal, uses the reference voltage, and drives each of the column electrodes EY1 to EY8 with a voltage waveform corresponding to the column control signal and the column-side delay amount selection signal. The column electrode drive circuit 4 can individually drive the column electrodes EY1 to EY8.

Figure 8:
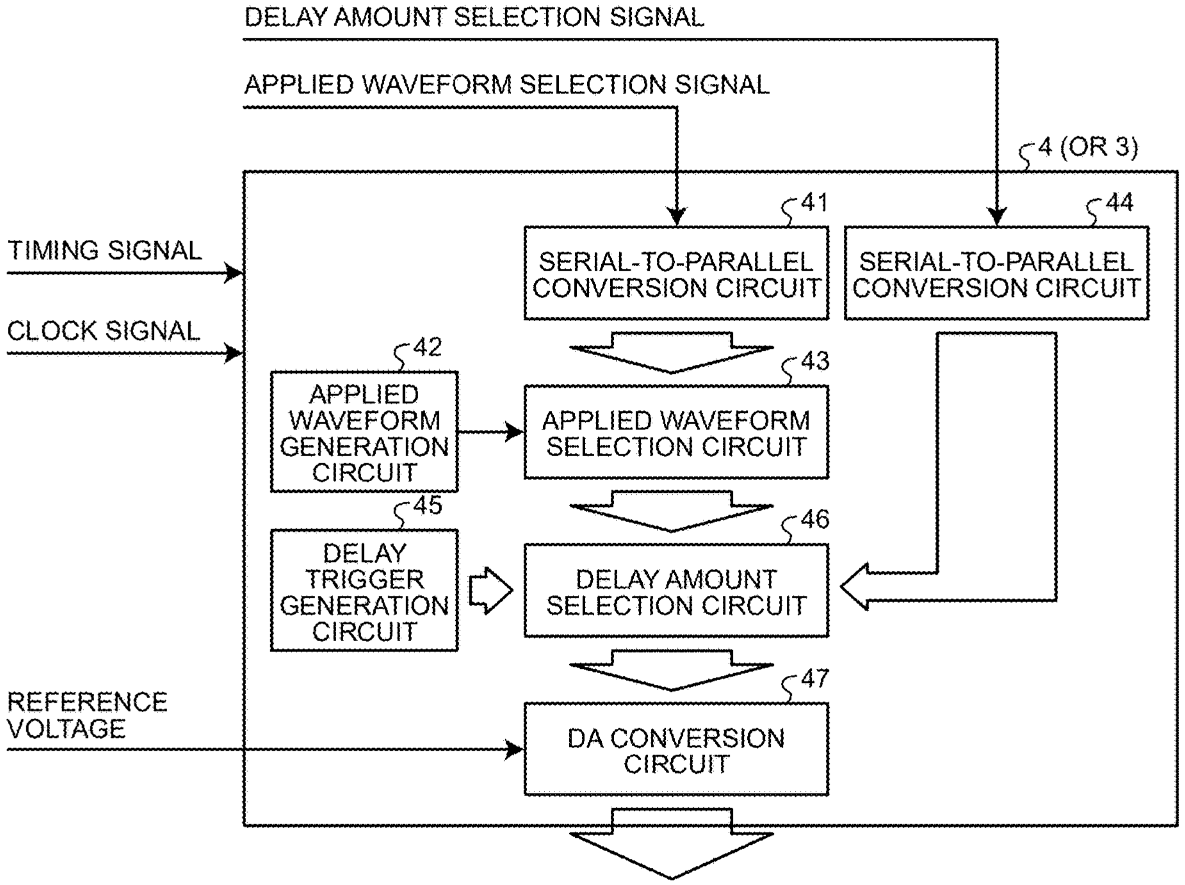
FIG. 8 is a block diagram illustrating a configuration of a column electrode drive circuit (or a row electrode drive circuit) in the embodiment.

The column electrode drive circuit 4 may be configured to digitally adjust the delay amount as illustrated in FIG. 8. FIG. 8 is a block diagram illustrating a configuration of the column electrode drive circuit 4 (or the row electrode drive circuit 3). In FIG. 8, the configuration of the column electrode drive circuit 4 is illustrated as an example, but the same applies to the configuration of the row electrode drive circuit 3. The column electrode drive circuit 4 adjusts the delay amount before performing the digital-to-analog (DA) conversion. The column electrode drive circuit 4 includes a serial-to-parallel conversion circuit 41, an applied waveform generation circuit 42, an applied waveform selection circuit 43, a serial-to-parallel conversion circuit 44, a delay trigger generation circuit 45, a delay amount selection circuit 46, and a DA conversion circuit 47.

The serial-to-parallel conversion circuit 41 receives an applied waveform selection signal from the arithmetic circuit 5. The serial-to-parallel conversion circuit 41 converts the applied waveform selection signal from a serial format to a parallel format, and supplies the converted applied waveform selection signal to the applied waveform selection circuit 43. The applied waveform generation circuit 42 generates applied waveform signals and supplies the applied waveform signals to the applied waveform selection circuit 43. In accordance with the applied waveform selection signal, the applied waveform selection circuit 43 selects an applied waveform signal to be used among the application waveform signals.

The serial-to-parallel conversion circuit 44 receives a delay amount selection signal from the arithmetic circuit 5. The serial-to-parallel conversion circuit 44 converts the delay amount selection signal from a serial format to a parallel format, and supplies the converted delay amount selection signal to the delay amount selection circuit 46. The delay trigger generation circuit 45 generates delay trigger signals and supplies the delay trigger signals to the delay amount selection circuit 46. In accordance with the delay amount selection signal, the delay amount selection circuit 46 selects a delay trigger signal to be used among the delay trigger signals.

Figure 9:
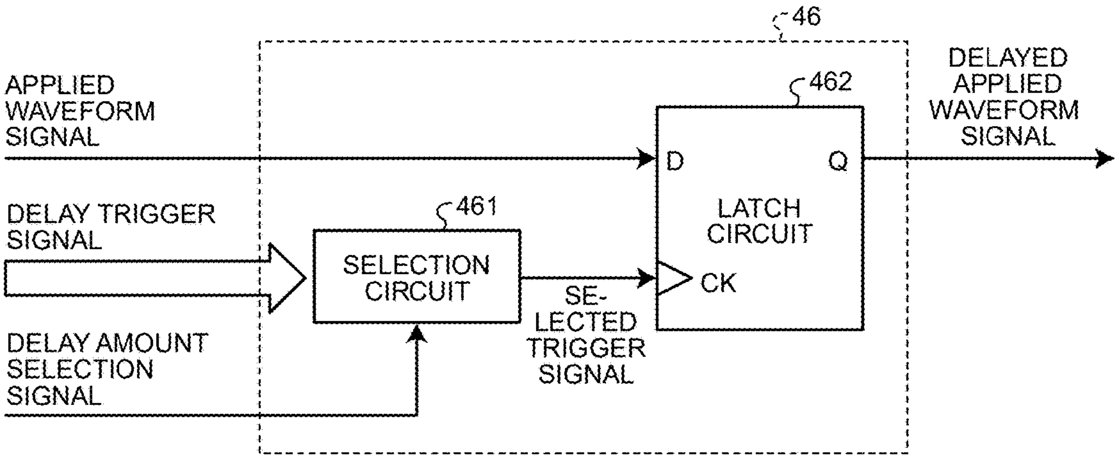
FIG. 9 is a block diagram illustrating a configuration of a delay amount selection circuit in the embodiment.

The delay amount selection circuit 46 can be configured as illustrated in FIG. 9. FIG. 9 is a block diagram illustrating a configuration of the delay amount selection circuit 46.

The delay amount selection circuit 46 includes a selection circuit 461 and a latch circuit 462. The selection circuit 461 receives delay trigger signals from the delay trigger generation circuit 45 and receives a delay amount selection signal from the serial-to-parallel conversion circuit 44.

Figure 10:
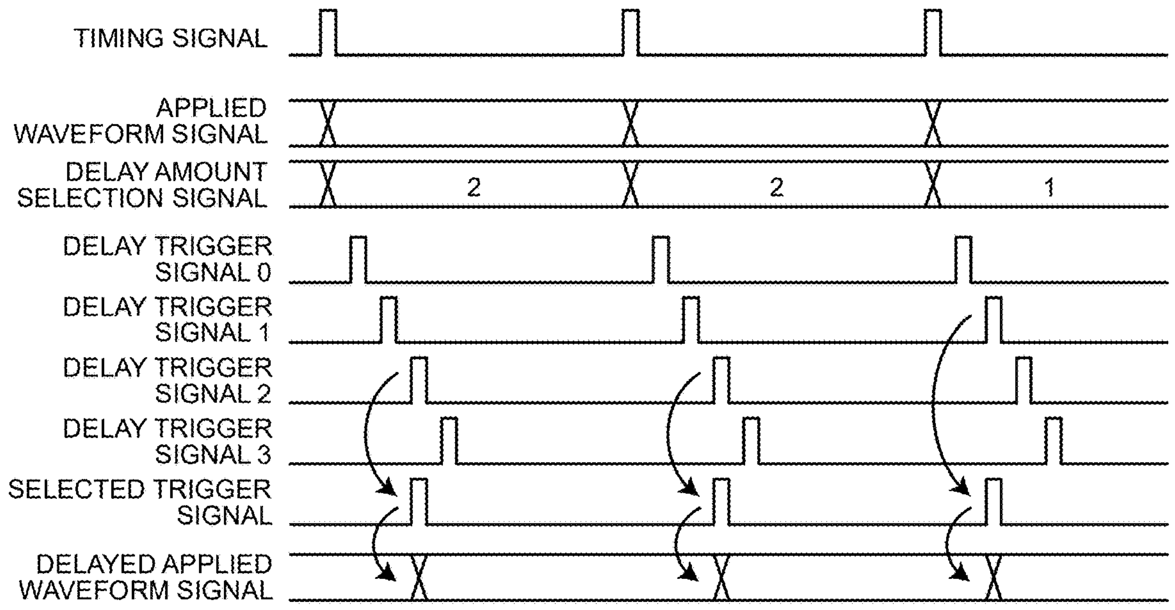
FIG. 10 is a waveform diagram illustrating an operation of the delay amount selection circuit in the embodiment.

As illustrated in FIG. 10, the delay trigger signals may be pulses having different edge timing. Each of the delay trigger signals may have edge timing indicating timing to be delayed. FIG. 10 is a waveform diagram illustrating an operation of the delay amount selection circuit 46. In FIG. 10, four delay trigger signals 0 to 3 are illustrated as an example. The delay amount selection signal is a signal indicating a delay amount to be added. FIG. 10 illustrates, as an example, a case where the delay amount selection signal includes "2" or "1" indicating the delay amount to be added.

The selection circuit 461 illustrated in FIG. 9 may be a multiplexer including input nodes corresponding to delay trigger signals and a control node that receives a delay amount selection signal. The selection circuit 461 selects one delay trigger signal among the delay trigger signals in accordance with the delay amount selection signal. FIG. 10 illustrates, as an example, a case where the delay trigger signal 2 is selected among the four delay trigger signals 0 to 3 in response to the delay amount selection signal including "2". FIG. 10 further illustrates, as an example, a case where the delay trigger signal 1 is selected among the four delay trigger signals 0 to 3 in response to the delay amount selection signal including "1".

The selection circuit 461 illustrated in FIG. 9 supplies the selected delay trigger signal to the latch circuit 462 as a selected trigger signal. FIG. 10 illustrates, as an example, a case where the delay trigger signal 2 or the delay trigger signal 1 is supplied to the latch circuit 462 as a selected trigger signal.

The latch circuit 462 illustrated in FIG. 9 receives an applied waveform signal from the applied waveform selection circuit 43 and receives a selected trigger signal from the selection circuit 461. The latch circuit 462 delays the timing of the applied waveform signal in accordance with the selected trigger signal. The latch circuit 462 may be a flip-flop including a data node D that receives an applied waveform signal, a clock node CK that receives a selected trigger signal, and an output node Q. The latch circuit 462 latches the applied waveform signal in synchronization with the rising edge of the selected trigger signal, and outputs the latched applied waveform signal from the output node Q to the DA conversion circuit 47 as a delayed applied waveform signal. FIG. 10 illustrates the applied waveform signal changing in synchronization with the timing signal. The latch circuit 462 latches the applied waveform signal in synchronization with the selected trigger signal, and as a result, the change timing of the delayed applied waveform signal is delayed from the timing signal.

In this way, the latch circuit 462 illustrated in FIG. 9 can delay the timing of the applied waveform signal to the timing synchronized with the rising edge of the selected trigger signal and output the delayed applied waveform signal. The DA conversion circuit 47 uses the reference voltage, perform DA conversion on the delayed applied waveform signal, generates an applied analog voltage, and applies the applied analog voltage to the column electrode EY.

Figure 11:
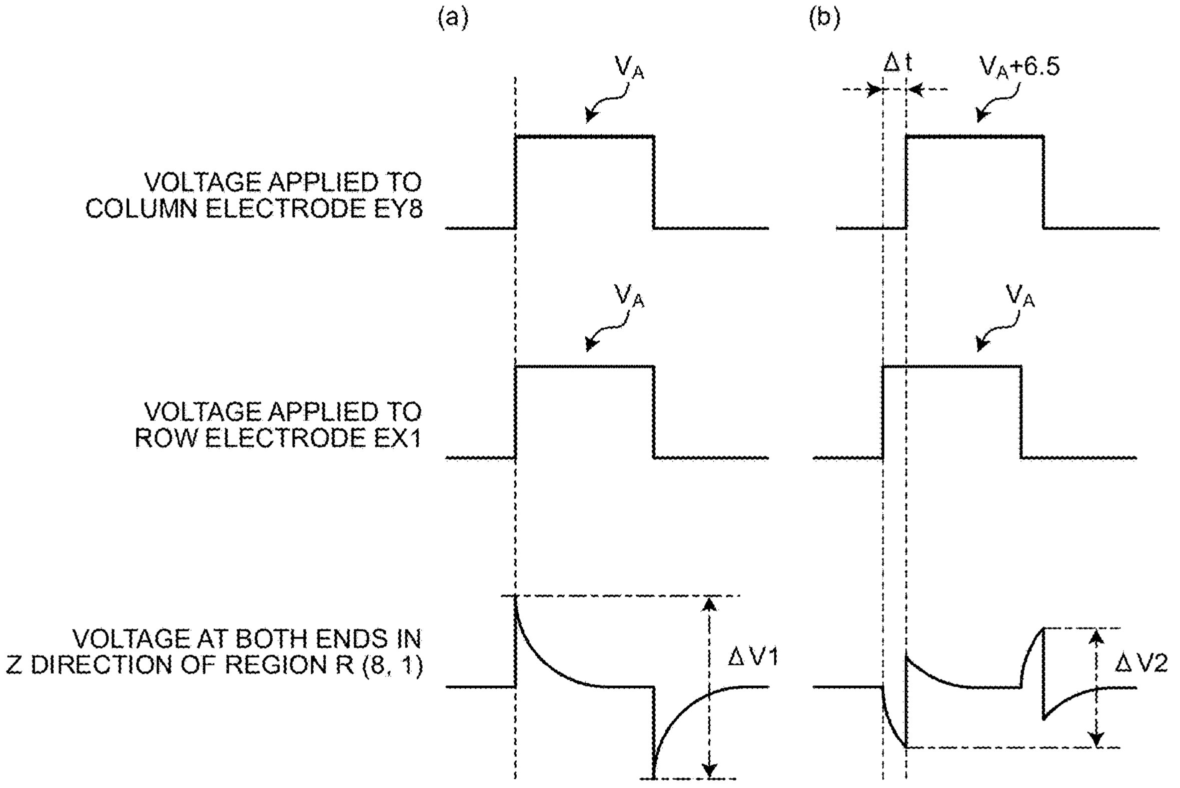
FIG. 11 is a waveform diagram illustrating fluctuation of voltage applied to a dimming layer in the embodiment.

In this way, as illustrated as an example in Part (b) in FIG. 11, a fluctuation range ΔV2 of the voltage applied to both ends in the Z direction of the light-shielding region R(8,1) can be reduced, compared to a fluctuation range ΔV1 in a case where none of the voltages at both ends illustrated in Part (a) in FIG. 11 is delayed. Note that, as illustrated in Part (b) in FIG. 11, a delay time Δt of the edge timing of the voltage applied to the column electrode EY8 from the edge timing of the voltage applied to the row electrode EX1 corresponds to the delay amount of 6.5 calculated by the arithmetic circuit 5.

As described above, in the present embodiment, the dimming device 1 adjusts the timing of either the voltage applied to the row electrode EX by the row electrode drive circuit 3 or the voltage applied to the column electrode EY by the column electrode drive circuit 4. As a result, in the dimming device 1, dimming on the region R in the OFF state in the dimming panel 2 can be stably performed, and the dimming performance can be improved.

Note that, as a first modification of the embodiment, the arithmetic circuit 5 illustrated in FIG. 1 may advance the timing of the voltage applied to the row electrode by the row electrode drive circuit 3 or the timing of the voltage applied to the column electrode by the column electrode drive circuit 4. The voltage whose timing is to be advanced has a larger delay amount with respect to the reference timing.

In this case, the delay amount generation circuit 53 illustrated in FIG. 5 may further have a function of obtaining not only the delay amount but also the phase advance amount. In accordance with the load amount signal, the delay amount generation circuit 53 obtains a delay amount or a phase advance amount to be added to the voltage supply to each light-shielding region R. The delay amount generation circuit 53 may obtain a delay amount that delays the timing of the voltage applied to the row electrode EX by the row electrode drive circuit 3 or the timing of the voltage applied to the column electrode EY by the column electrode drive circuit 4. The voltage whose timing is to be delayed has a smaller delay amount with respect to the reference timing. Alternatively, the delay amount generation circuit 53 may obtain a phase advance amount that advances the timing of the voltage applied to the row electrode by the row electrode drive circuit 3 or the timing of the voltage applied to the column electrode by the column electrode drive circuit 4. The voltage whose timing is to be advanced has a larger delay amount with respect to the reference timing. Further alternatively, the delay amount generation circuit 53 may obtain both the delay amount and the phase advance amount.

In the light-shielding pattern illustrated in FIG. 3, when FIG. 6A and FIG. 6B are compared with each other, the load amount attributable to the column electrode EY is smaller than the load amount attributable to the row electrode EX in all the light-shielding regions R. This leads to an expectation that the delay amount of the voltage applied to the column electrode EY by the column electrode drive circuit 4 is smaller than the delay amount of the voltage applied to the row electrode EX by the row electrode drive circuit 3. In other words, the delay amount of the voltage applied to the row electrode EX by the row electrode drive circuit 3 is expected to be larger than the delay amount of the voltage applied to the column electrode EY by the column electrode drive circuit 4.

For this reason, the delay amount generation circuit 53 advances the row control signal and delays the column control signal such that the load amount difference between both ends in the Z direction approaches zero.

Figure 12A:
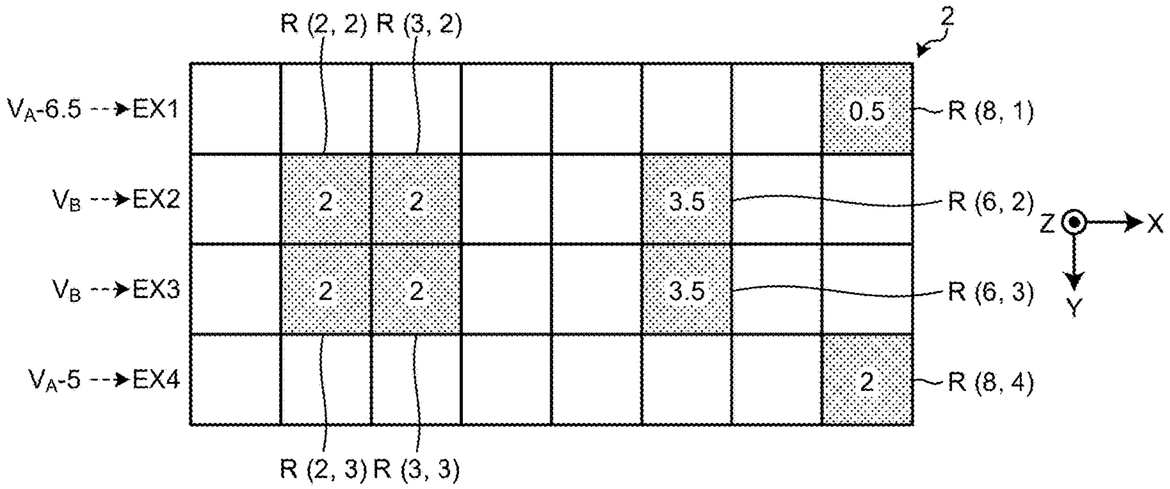
FIGS. 12A to 12C are diagrams each illustrating estimation of a delay amount in a first modification of the embodiment.

As illustrated in FIG. 12A, the delay amount generation circuit 53 sets the phase advance amount to be added to the voltages applied to the row electrodes EX1, EX2, EX3, and EX4 to −6.5, 0, 0, and −5. In this way, voltages applied to the row electrodes EX1, EX2, EX3, and EX4 are $V_A$−6.5, $V_B$, $V_B$, and $V_A$−5, respectively.

Figure 12B:
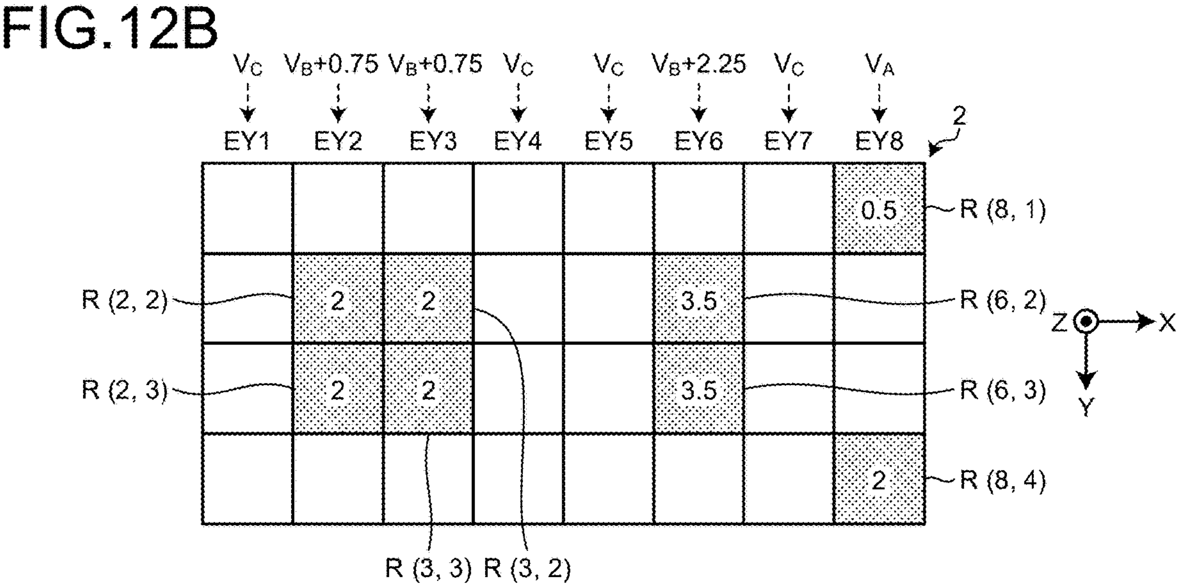

As illustrated in FIG. 12B, the delay amount generation circuit 53 sets delay amounts to be added to voltages applied to the column electrodes EY1, EY2, EY3, EY4, EY5, EY6, EY7, and EY8 to 0, 0.75, 0.75, 0, 0, 2.25, 0, and 0, respectively. In this way, the voltages applied to the column electrodes EY1, EY2, EY3, EY4, EY5, EY6, EY7, and EY8 are $V_C$, $V_B$+0.75, $V_B$+0.75, $V_C$, $V_C$, $V_B$+2.25, $V_C$, and $V_A$, respectively.

Figure 12C:
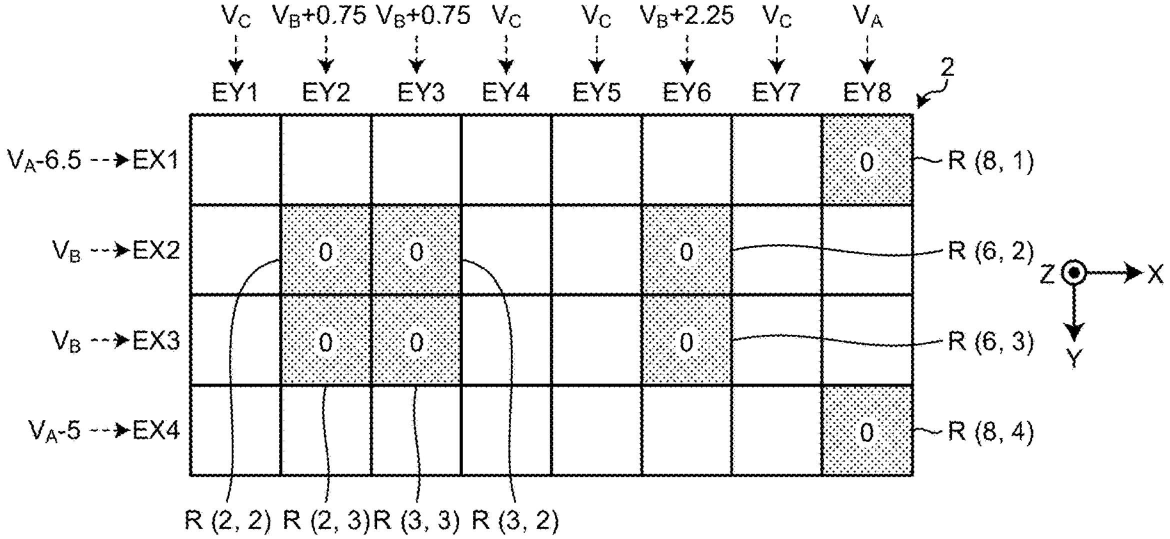

As a result, as illustrated in FIG. 12C, the load amount difference between both ends in the Z direction of each light-shielding region R approaches zero. The total load amounts of the region R(8,1), the region R(2,2), the region R(3,2), the region R(6,2), the region R(2,3), the region R(3,3), the region R(6,3), and the region R(8,4) are 0, 0, 0, 0, 0, 0, 0, and 0, respectively.

As described above, by combining the delay of the timing of the voltage having a smaller delay amount with respect to the reference timing and the phase advance of the timing of the voltage having a larger delay amount with respect to the reference timing, the accuracy of the timing adjustment with respect to the dimming panel 2 can be further improved.

Figure 13:
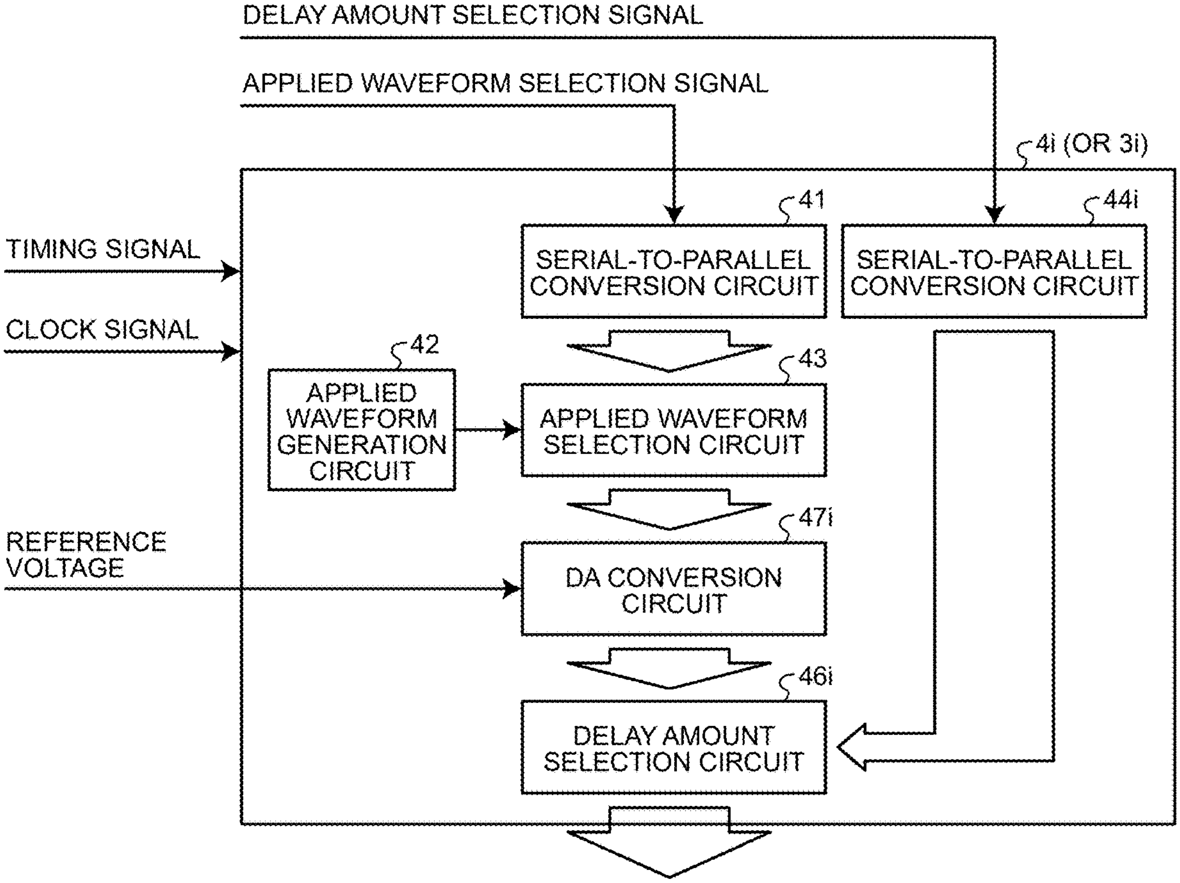
FIG. 13 is a block diagram illustrating a configuration of a column electrode drive circuit (or a row electrode drive circuit) in a second modification of the embodiment.

Alternatively, as a second modification of the embodiment, a column electrode drive circuit 4*i* (or a row electrode drive circuit 3*i*) may be configured to adjust the delay amount in an analog manner as illustrated in FIG. 13. FIG. 13 is a block diagram illustrating a configuration of the column electrode drive circuit 4*i* (or the row electrode drive circuit 3*i*) in the second modification of the embodiment. In FIG. 13, the configuration of the column electrode drive circuit 4*i* is illustrated as an example, but the same applies to the configuration of the row electrode drive circuit 3*i*. The column electrode drive circuit 4*i* (or the row electrode drive circuit 3*i*) adjusts the delay amount after performing the DA conversion.

The column electrode drive circuit 4 includes a serial-to-parallel conversion circuit 44*i*, a delay amount selection circuit 46*i*, and a DA conversion circuit 47*i* instead of the serial-to-parallel conversion circuit 44, the delay amount selection circuit 46, and the DA conversion circuit 47 (see FIG. 8), and the delay trigger generation circuit 45 is omitted.

The DA conversion circuit 47*i* receives an applied waveform signal from the applied waveform selection circuit 43. The DA conversion circuit 47*i* uses the reference voltage, perform DA conversion on the applied waveform signal, generates an applied analog voltage, and supplies the applied analog voltage to the delay amount selection circuit 46*i*.

The delay amount selection circuit 46*i* receives the applied analog voltage from the DA conversion circuit 47*i* and receives the delay amount selection signal from the serial-to-parallel conversion circuit 44*i*. The delay amount selection circuit 46*i* adds a delay amount to the applied analog voltage in accordance with the delay amount selection signal.

Figure 14:
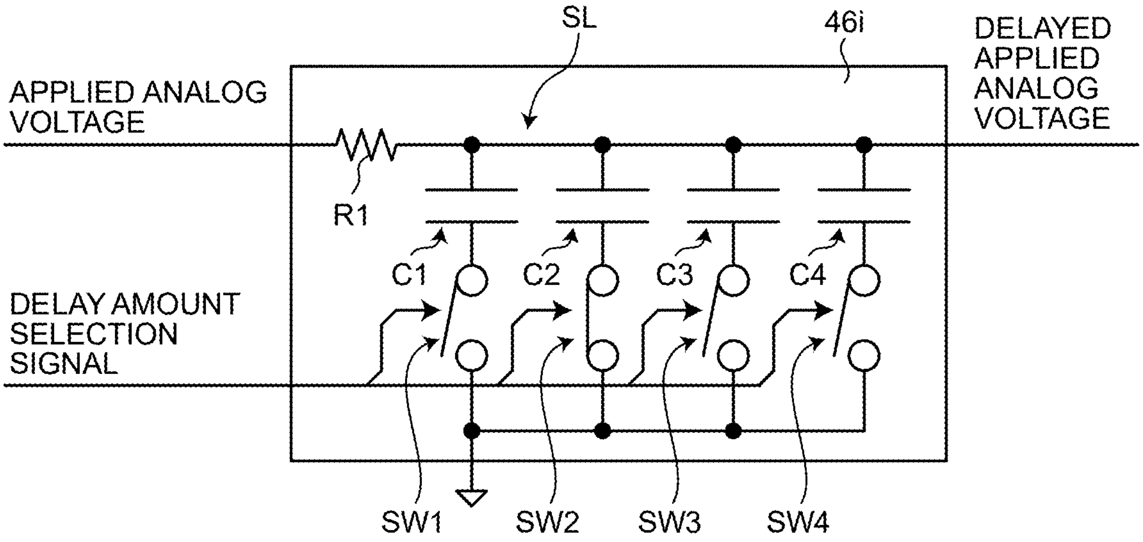
FIG. 14 is a circuit diagram illustrating a configuration of a delay amount selection circuit in the second modification of the embodiment.

The delay amount selection circuit 46*i* can be configured as illustrated in FIG. 14. FIG. 14 is a circuit diagram illustrating a configuration of the delay amount selection circuit 46*i* in the second modification of the embodiment.

The delay amount selection circuit 46*i* includes a resistance element R1, a plurality of capacitance elements C1 to C4, and a plurality of switches SW1 to SW4. The resistance element R1 is electrically inserted on a signal line SL. The capacitance elements C1 to C4 correspond to the switches SW1 to SW4, respectively. Each of the capacitance elements C1 to C4 has one end connected to a signal line SL and the other end connected to the ground potential via the corresponding switch SW.

Figure 15:
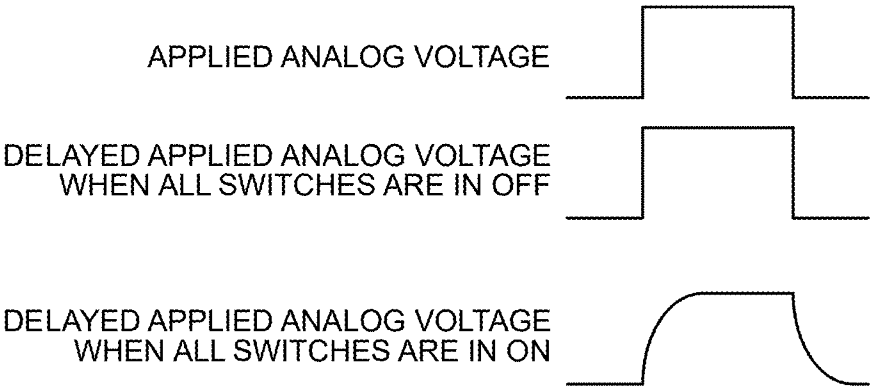
FIG. 15 is a waveform diagram illustrating an operation of the delay amount selection circuit in the second modification of the embodiment.

Each of the switches SW1 to SW4 receives the delay amount selection signal at the control terminal. By keeping each of the switches SW1 to SW4 in the OFF state, the corresponding capacitance element C is deactivated and the delay amount of the signal line SL is reduced. For example, when all the switches SW1 to SW4 are turned off, as illustrated in the second waveform from the top in FIG. 15, a delay amount of zero is added to the applied analog voltage to generate a delayed applied analog voltage, and the delayed applied analog voltage is applied to the column electrode EY. FIG. 15 is a waveform diagram illustrating an operation of the delay amount selection circuit 46*i* in the second modification of the embodiment.

By keeping each of the switches SW1 to SW4 in the ON state, the corresponding capacitance element C is activated and the delay amount of the signal line SL is increased. For example, when all the switches SW1 to SW4 are turned on, as illustrated in the third waveform from the top in FIG. 15, a desired delay amount is added to the applied analog voltage to generate a delayed applied analog voltage, and the delayed applied analog voltage is applied to the column electrode EY.

In this way, the delay amount selection circuit 46*i* can add a delay amount corresponding to the delay amount selection signal to the applied analog voltage transmitted through the signal line SL.

As described above, by performing the adjustment of the delay amount in an analog manner by the column electrode drive circuit 4*i* (or the row electrode drive circuit 3*i*), the voltage to which the desired delay amount is added can be applied to each region R of the dimming panel 2.

Figure 16:
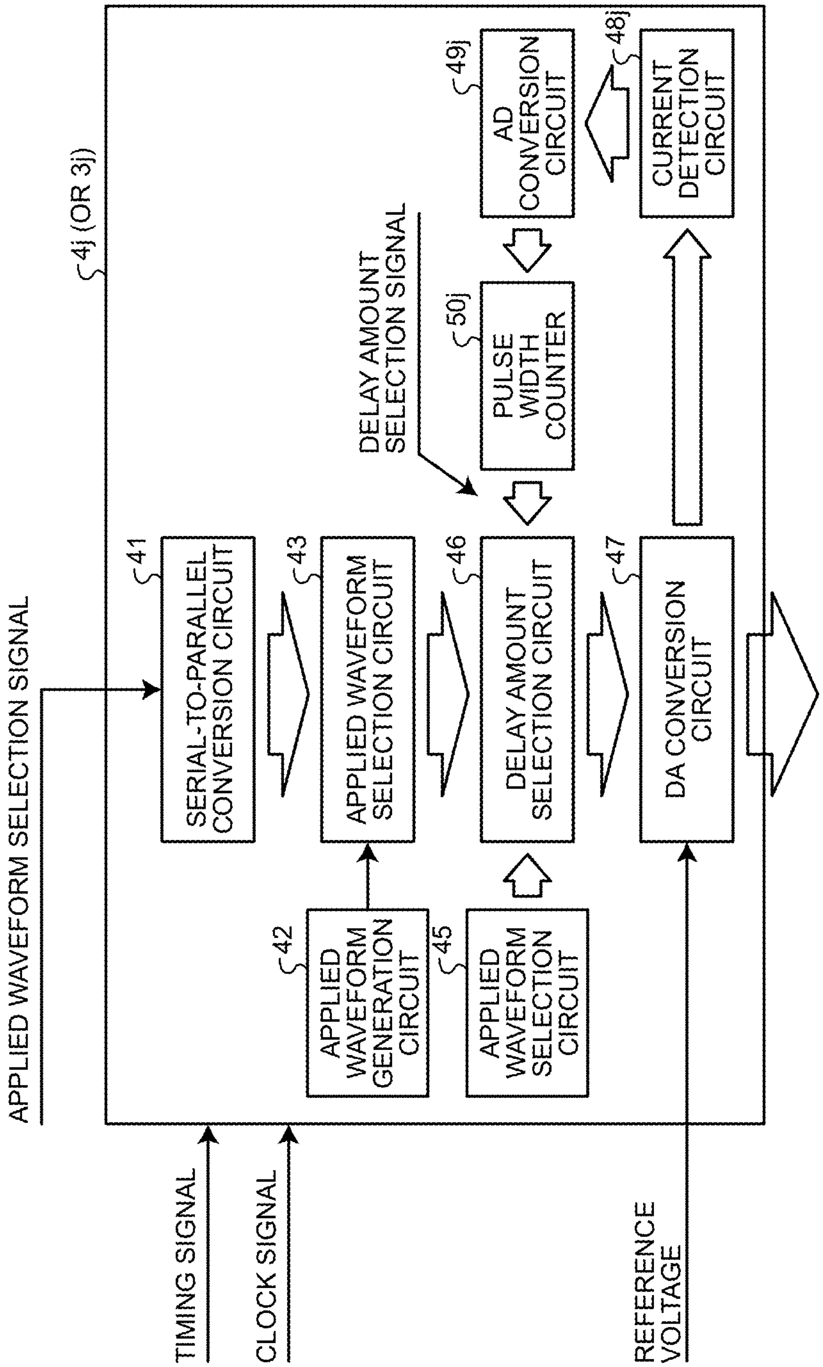
FIG. 16 is a block diagram illustrating a configuration of a column electrode drive circuit (or a row electrode drive circuit) in a third modification of the embodiment.

Alternatively, as a third modification of the embodiment, a column electrode drive circuit 4*j* (or a row electrode drive circuit 3*j*) may be configured to internally generate a delay amount selection signal as illustrated in FIG. 16. FIG. 16 is a block diagram illustrating a configuration of the column electrode drive circuit 4*j* (or the row electrode drive circuit 3*j*) in the third modification of the embodiment. In FIG. 16, the configuration of the column electrode drive circuit 4*j* is illustrated as an example, but the same applies to the configuration of the row electrode drive circuit 3*j*. The column electrode drive circuit 4*j* (or the row electrode drive circuit 3*j*) performs feedback control of monitoring the current applied to the column electrode EY (or the row electrode EX) and feeding back the delay amount selection signal in accordance with the monitoring result.

The column electrode drive circuit 4*j* further includes a current detection circuit 48*j*, an analog-to-digital (AD) conversion circuit 49*j*, and a pulse width counter 50*j* in addition to the components of the column electrode drive circuit 4 (see FIG. 8).

The current detection circuit 48*j* monitors the current applied from the DA conversion circuit 47 to the column electrode EY.

Figure 17A:
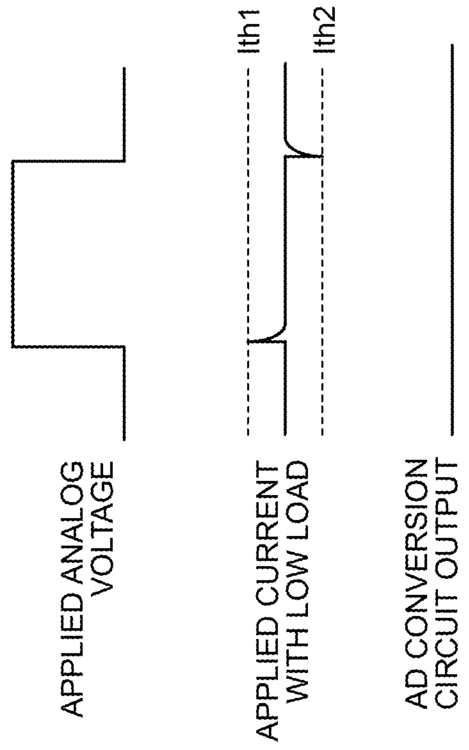
FIGS. 17A and 17B are waveform diagrams each illustrating operations of a current detection circuit and an analog-to-digital (AD) conversion circuit in the third modification of the embodiment.
Figure 17B:
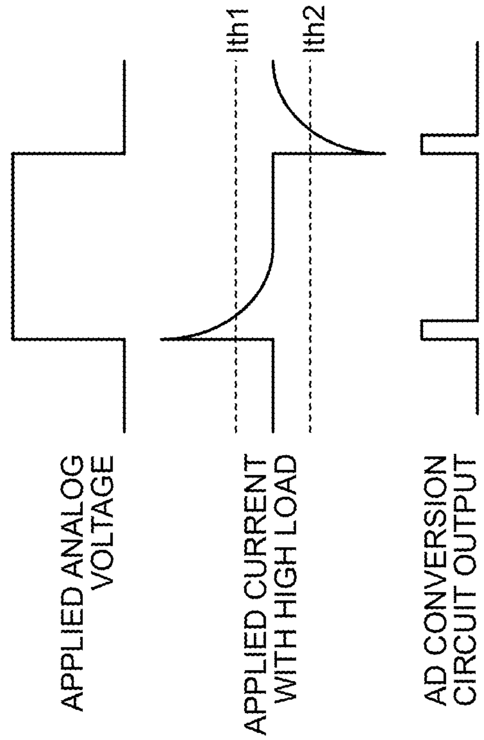

FIGS. 17A and 17B are waveform diagrams each illustrating operations of the current detection circuit 48*j* and the AD conversion circuit 49*j* in the third modification of the embodiment. As illustrated in FIG. 17A, when the applied current falls within a range between a lower limit threshold value Ith2 and an upper limit threshold value Ith1, inclusive, the current detection circuit 48*j* generates a deviation signal indicating that an amount deviating from the range from the lower limit threshold value Ith2 to the upper limit threshold value Ith1 of the applied current is zero, and supplies the deviation signal to the AD conversion circuit 49*j*. The AD conversion circuit 49*j* performs AD conversion on the deviation signal, generates an AD conversion circuit output for keeping a level of zero, and outputs the AD conversion circuit output to the pulse width counter 50*j*. The pulse width counter 50*j* counts up and provides zero as a pulse width in the AD conversion circuit output, generates a delay amount selection signal indicating a delay amount of zero, and supplies the delay amount selection signal to the delay amount selection circuit 46.

On the other hand, when the applied current does not fall within the range between the lower limit threshold value Ith2 and the upper limit threshold value Ith1 as illustrated in FIG. 17B, namely, when the applied current deviates from the range from the lower limit threshold value Ith2 to the upper limit threshold value Ith1, the current detection circuit 48*j* generates a deviation signal indicating that there is an amount deviating from the range from the lower limit threshold value Ith2 to the upper limit threshold value Ith1 of the applied current, and supplies the deviation signal to the AD conversion circuit 49*j*. The deviation signal may be a signal indicating an absolute value of the amount deviating from the range from the lower limit threshold value Ith2 to the upper limit threshold value Ith1 of the applied current. The AD conversion circuit 49*j* performs AD conversion on the deviation signal, generates an AD conversion circuit output including a pulse having a width corresponding to the time when the applied current deviates from the range from the lower limit threshold value Ith2 to the upper limit threshold value Ith1, and outputs the AD conversion circuit output to the pulse width counter 50*j*. The pulse width counter 50*j* counts up and provides a finite value as a pulse width in the AD conversion circuit output, generates a delay amount selection signal indicating a desired delay amount, and supplies the delay amount selection signal to the delay amount selection circuit 46.

As described above, by internally generating the delay amount selection signal in the column electrode drive circuit 4*j* (or the row electrode drive circuit 3*j*), the voltage to which the desired delay amount is added can be applied to each region R of the dimming panel 2.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A dimming device, comprising:

a dimming layer including a first main surface and a second main surface, the second main surface being provided opposite the first main surface;

a plurality of first electrodes, each of the first electrodes extending in a row direction and facing the first main surface;

a plurality of second electrodes, each of the second electrodes extending in a column direction and facing the second main surface;

a row drive circuit configured to apply a first voltage to the first electrodes;

a column drive circuit configured to apply a second voltage to the second electrodes; and a control circuit configured to adjust a timing of either the first voltage to be applied to the first electrodes by the row drive circuit or the second voltage to be applied to the second electrodes by the column drive circuit, wherein the control circuit is configured to delay the timing of either the first voltage to be applied to the first electrodes by the row drive circuit or the second voltage to be applied to the second electrodes by the column drive circuit, the first voltage or the second voltage whose timing is to be delayed having a smaller delay amount with respect to a reference timing.

2. A dimming device, comprising:

a dimming layer including a first main surface and a second main surface, the second main surface being provided opposite the first main surface;

a plurality of first electrodes, each of the first electrodes extending in a row direction and facing the first main surface;

a plurality of second electrodes, each of the second electrodes extending in a column direction and facing the second main surface;

a row drive circuit configured to apply a first voltage to the first electrodes;

a column drive circuit configured to apply a second voltage to the second electrodes; and a control circuit configured to adjust a timing of either the first voltage to be applied to the first electrodes by the row drive circuit or the second voltage to be applied to the second electrodes by the column drive circuit, wherein the control circuit is configured to advance the timing of either the first voltage to be applied to the first electrodes by the row drive circuit or the second voltage to be applied to the second electrodes by the column drive circuit, the first voltage or the second voltage whose timing is to be advanced having a larger delay amount with respect to a reference timing.

3. The dimming device according to claim 1, wherein the dimming layer includes multiple regions being partitioned into a matrix in accordance with the first voltage of the first electrodes and the second voltage of the second electrodes, and the control circuit is configured to, for each of the multiple regions, identify the first voltage or the second voltage whose delay amount with respect to the reference timing is smaller from among the first voltage to be applied to the first electrodes by the row drive circuit and the second voltage to be applied to the second electrodes by the column drive circuit, and delay a timing of the first voltage or the second voltage identified.

4. The dimming device according to claim 2, wherein the dimming layer includes multiple regions being partitioned into a matrix in accordance with the first voltage of the first electrodes and the second voltage of the second electrodes, and the control circuit is configured to, for each of the multiple regions, identify the first voltage or the second voltage whose delay amount with respect to the reference timing is larger from among the first voltage to be applied to the first electrodes by the row drive circuit and the second voltage to be applied to the second electrodes by the column drive circuit, and advance a timing of the first voltage or the second voltage identified.

5. The dimming device according to claim 1, wherein the dimming layer includes multiple regions being partitioned into a matrix in accordance with the first voltage of the first electrodes and the second voltage of the second electrodes, and the control circuit is configured to receive a dimming signal including a designation of an applied waveform to be supplied to the first electrodes and the second electrodes, identify a light-shielding pattern based on the dimming signal, the light-shielding pattern being a pattern of light-shielding regions in the multiple regions, the light-shielding regions being controlled to be in an OFF state, calculate a load amount of a third voltage to be supplied to the light-shielding regions in accordance with the light-shielding pattern, and obtain, based on the load amount, a delay amount to be added to the third voltage to be supplied to the light-shielding regions.

6. A dimming method implemented by a dimming device, the dimming device including a dimming layer, a plurality of first electrodes, a plurality of second electrodes, a row drive circuit, and a column drive circuit, the dimming layer including a first main surface and a second main surface, the second main surface being provided opposite the first main surface, each of the first electrodes extending in a row direction and facing the first main surface, each of the second electrodes extending in a column direction and facing the second main surface, the row drive circuit serving to apply a first voltage to the first electrodes, the column drive circuit serving to apply a second voltage to the second electrodes, the dimming method comprising:

adjusting a timing of either the first voltage to be applied to the first electrodes by the row drive circuit or the second voltage to be applied to the second electrodes by the column drive circuit, wherein the adjusting includes delaying the timing of either the first voltage to be applied to the first electrodes by the row drive circuit or the second voltage to be applied to the second electrodes by the column drive circuit, the first voltage or the second voltage whose timing is to be delayed having a smaller delay amount with respect to a reference timing.

7. The dimming method according to claim 6, wherein the adjusting further includes advancing the timing of the first voltage to be applied to the first electrodes by the row drive circuit or the timing of the second voltage to be applied to the second electrodes by the column drive circuit, the first voltage or the second voltage whose timing is to be advanced having a larger delay amount with respect to the reference timing.

8. The dimming method according to claim 7, wherein the dimming layer includes multiple regions being partitioned into a matrix in accordance with the first voltage of the first electrodes and the second voltage of the second electrodes, and the adjusting includes, for each of the multiple regions, identifying the first voltage or the second voltage whose delay amount with respect to the reference timing is smaller from among the first voltage to be applied to the first electrodes by the row drive circuit and the second voltage to be applied to the second electrodes by the column drive circuit, and delaying a timing of the first voltage or the second voltage identified.

9. The dimming method according to claim 7, wherein the dimming layer includes multiple regions being partitioned into a matrix in accordance with the first voltage of the first electrodes and the second voltage of the second electrodes, and the adjusting includes, for each of the multiple regions, identifying the first voltage or the second voltage whose delay amount with respect to the reference timing is larger from among the first voltage to be applied to the first electrodes by the row drive circuit and the second voltage to be applied to the second electrodes by the column drive circuit, and advancing a timing of the first voltage or the second voltage identified.

10. The dimming method according to claim 6, wherein the dimming layer includes multiple regions being partitioned into a matrix in accordance with the first voltage of the first electrodes and the second voltage of the second electrodes, and the adjusting includes receiving a dimming signal including a designation of an applied waveform to be supplied to the first electrodes and the second electrodes, identifying a light-shielding pattern based on the dimming signal, the light-shielding pattern being a pattern of light-shielding regions in the multiple regions, the light-shielding regions being controlled to be in an OFF state, calculating a load amount of a third voltage to be supplied to the light-shielding regions in accordance with the light-shielding pattern, and obtaining, based on the load amount, a delay amount to be added to the third voltage to be supplied to the light-shielding regions.

* * * * *